United States Patent

Keller et al.

[11] Patent Number: 5,891,337
[45] Date of Patent: Apr. 6, 1999

[54] FILTER WITH MOLDED END CAP AND MEDIA SPACER

[75] Inventors: Dennis B. Keller, Salem, Ohio; Donald R. Denton, Henryetta, Okla.

[73] Assignee: Air-Maze Corporation, Stow, Ohio

[21] Appl. No.: 888,978

[22] Filed: Jul. 7, 1997

Related U.S. Application Data

[63] Continuation-in-part of Ser. No. 346,699, Nov. 30, 1994, abandoned.

[51] Int. Cl.⁶ .................................................. B01D 27/08
[52] U.S. Cl. ..................... 210/443; 210/493.2; 55/510; 264/263; 264/DIG. 48
[58] Field of Search ................................ 210/443, 450, 210/493.2, 495, 497.01; 55/510; 264/263, 271.1, 273, 275, DIG. 48

[56] References Cited

U.S. PATENT DOCUMENTS

| | | |
|---|---|---|
| 2,460,168 | 1/1949 | Caerta . |
| 2,771,156 | 11/1956 | Kasten et al. . |
| 2,919,765 | 1/1960 | Kasten . |
| 3,747,772 | 7/1973 | Brown . |
| 5,030,256 | 7/1991 | Lingle . |
| 5,252,204 | 10/1993 | Chiodo . |
| 5,275,636 | 1/1994 | Dudley et al. . |
| 5,518,608 | 5/1996 | Boone . |

FOREIGN PATENT DOCUMENTS

| | | |
|---|---|---|
| 2251347 | 6/1975 | France . |
| 1062675 | 5/1959 | Germany . |
| 1151592 | 5/1969 | United Kingdom . |
| 2005777 | 4/1979 | United Kingdom . |
| 2134811 | 8/1984 | United Kingdom . |
| 2197802 | 6/1988 | United Kingdom . |

Primary Examiner—Matthew O. Savage
Attorney, Agent, or Firm—Rankin, Hill, Porter & Clark LLP

[57] ABSTRACT

A filter of the type used to filter gases or liquids has molded plastic end caps on each end of the filter element with the ends of the filter element molded into the end caps. To prevent the end of the filter element from being exposed through the exterior surface of one of the end caps, a spacer is located between the end of the filter element and the exterior surface of the end cap. The spacer allows the plastic material of the end cap to permeate the spacer to form a thin layer of plastic on the end of the filter element. This prevents thin spots in the end cap which could result in leakage through the end cap.

10 Claims, 3 Drawing Sheets

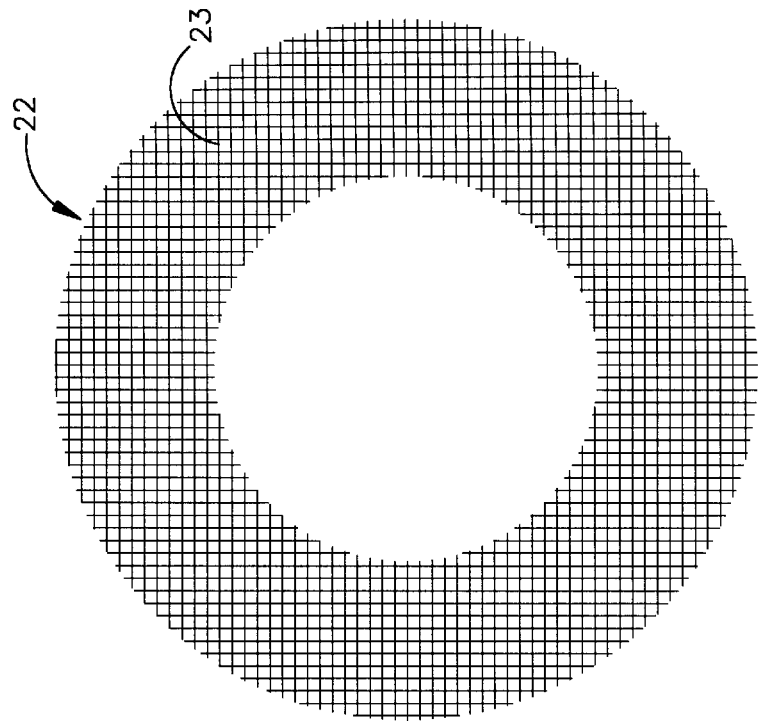
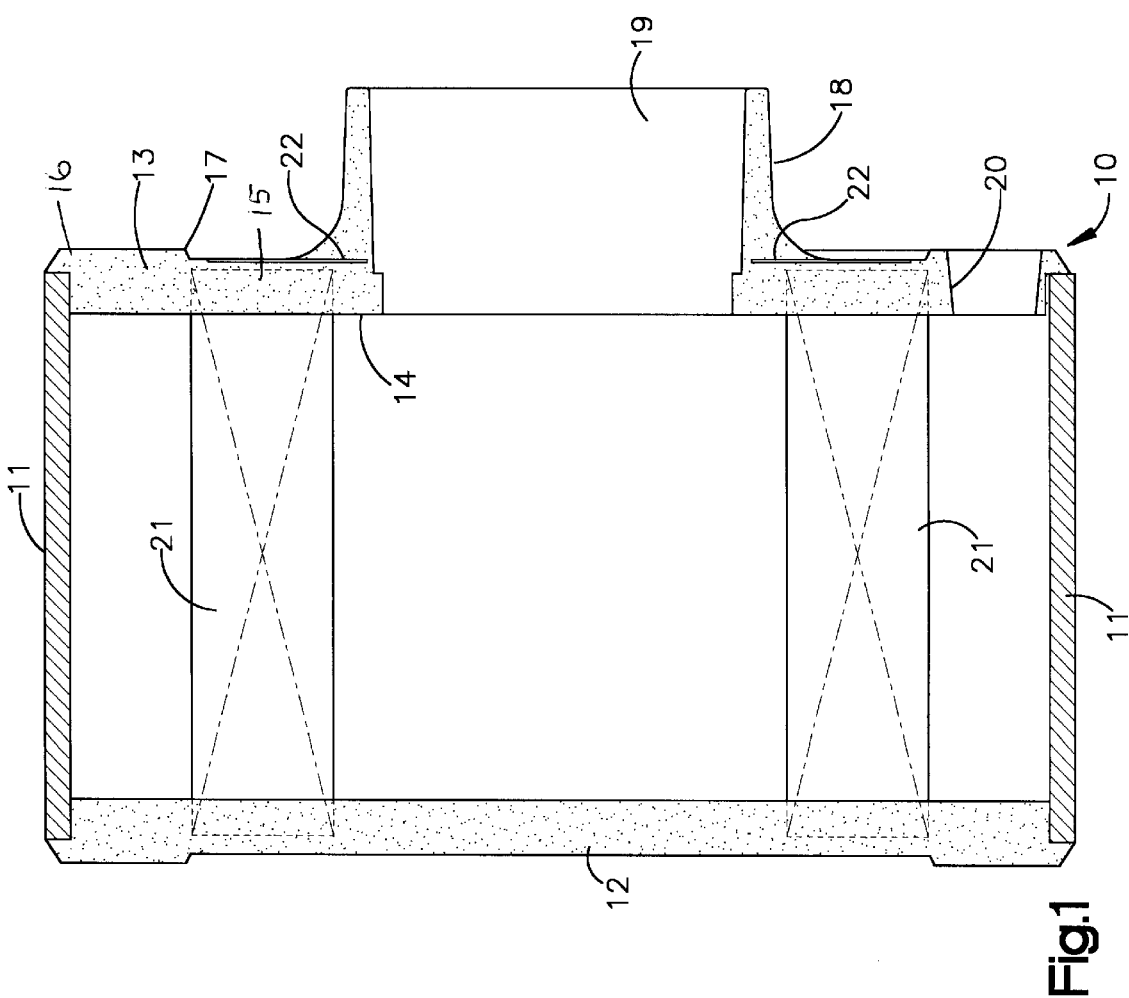

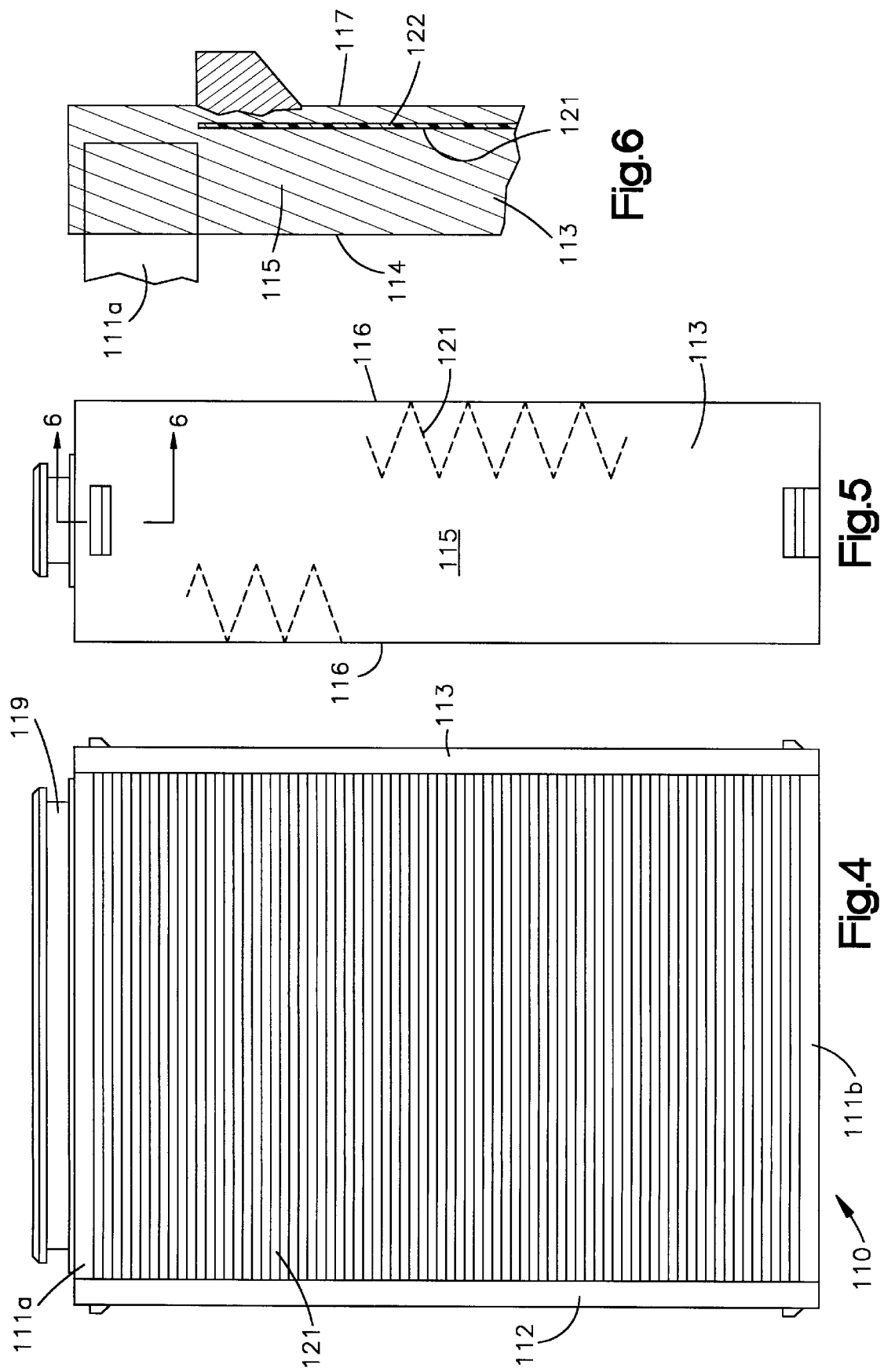

FILTER WITH MOLDED END CAP AND MEDIA SPACER

CROSS REFERENCE TO RELATED APPLICATION

This is a continuation in part of application Ser. No. 08/346,699, filed Nov. 30, 1994, now abandoned.

BACKGROUND OF THE INVENTION

1. Field of the Invention

This invention relates to the manufacture of filters, and more particularly to the manufacture of filters having molded plastic end caps.

2. Description of the Prior Art

Filters, such as fluid filters for gases and liquids used for motors, carburetors, compressors and other devices, are commonly formed of filter media or a filter element with top and bottom end caps formed on each end of the filter element. The end caps are usually molded in place by introducing plastic resin into the mold and positioning the filter element in a mold and allowing the resin to harden. When the filter element is positioned in the mold, the bottom end of the filter element rests on the upper surface of the interior of the mold.

In order to provide for sufficient plastic material between the end of the filter element and the exterior surface of the end cap, the interior surface of the mold has usually been provided with at least one ridge upon which the bottom end of the filter element rests. If the interior surface of the mold were flat, there would be very little if any plastic between the end of the filter element and the exterior surface of the end cap, and, as a result, the end of the filter element would be exposed and fluid could leak through end cap at this location. The ridges allow the end of the filter element to be raised above the remaining surface of the mold so that sufficient plastic is present between the end of the filter element and the exterior surface of the end cap when the end cap is formed. However, even when ridges are used, the end of the filter element is still exposed to the exterior of the end caps along these ridges, creating locations in which there is little or no resin material covering the end of the filter element, and the possibility still exists that the end caps could allow leakage of fluid at these locations.

SUMMARY OF THE INVENTION

The present invention overcomes the problems of the prior art and provides other advantages that have not been realied heretofore. In accordance with the present invention, a spacer element is provided between the end of the filter element and the upper surface of the interior of the mold when the end cap is formed. The spacer raises the end of the filter element above the interior mold surface when the end cap is formed. The spacer also permits the formation of a layer of resin between the end of the filter elements and mold surface. The end cap is thus formed with a layer of plastic between the end of the filter element and the exterior surface of the end cap, so that the layer of plastic is exposed and the end of the filter element is not. The resulting plastic layer prevents the formation of thin spots in the end cap around the end of the filter element, which spots would otherwise allow leakage of fluid through the end cap bypassing the filter element.

In accordance with the present invention, the spacer is used to provide an economical and uncomplicated way to space the end of the filter element away from the mold surface when the end cap is formed. Using the spacer of the present invention, filters can be manufactured using existing techniques while avoiding the formation of thin spots in the end cap which could result in leaking. In addition, ridges in the outer surface of the end cap are no longer necessary, since the ridges need not be used to raise the end of the filter element. The end cap outer surface can be made flat if desired, permitting a range in exterior shapes for the end caps.

The preferred spacer of the present invention is made of a plastic mesh material which allows the resin in the mold to permeate the spacer and form a thin plastic layer within the spacer between the end of the filter element and the exterior surface of the end cap. While other types of spacers can be used, the mesh allows the plastic resin to be present in this location to provide an integral end cap construction.

These and other advantages are provided by the present invention of a filter which comprises a filter element having opposite first and second ends and a first end cap molded on the first end of the filter element. The second end cap is molded onto the second end of the filter element. The second end cap has an central portion and a side portion, the central portion of the second end cap having an exterior surface and an interior surface. The filter element extends from the interior surface. A spacer is positioned between the second end of the filter element and the exterior surface of the second end cap. The spacer is exposed for at least a portion of the exterior surface of the central portion of the second end cap. The plastic resin material permeates the spacer to provide a layer of plastic resin material between the second end of the filter element and the outer surface of the second end cap.

In accordance with another aspect of the present invention, a method is provided for making a filter. The method comprises the steps of providing a mold for an end cap with the mold having an interior surface, introducing a plastic resin material into the mold, placing an end of a filter element into the mold, positioning a spacer between the end of the filter element and the interior surface of the mold to allow the end of the filter element to rest on the spacer which in turn rests on the interior surface, allowing the resin material to permeate the spacer to form an end cap with a layer of resin material between the end of the filter element and the interior surface of the mold, and removing the resin material from the mold to form an end cap.

BRIEF DESCRIPTION OF THE DRAWINGS

FIG. 1 is a side sectional view of a filter embodying the present invention.

FIG. 2 is an end elevational view of the spacer of FIG. 1.

FIG. 4 is a side elevational view of another filter showing a second embodiment of the present invention.

FIG. 5 is a end elevational view of the spacer of FIG. 4.

FIG. 6 is a sectional view taken along line 6—6 of FIG. 4.

DETAILED DESCRIPTION OF THE PREFERRED EMBODIMENT

Figure 3:
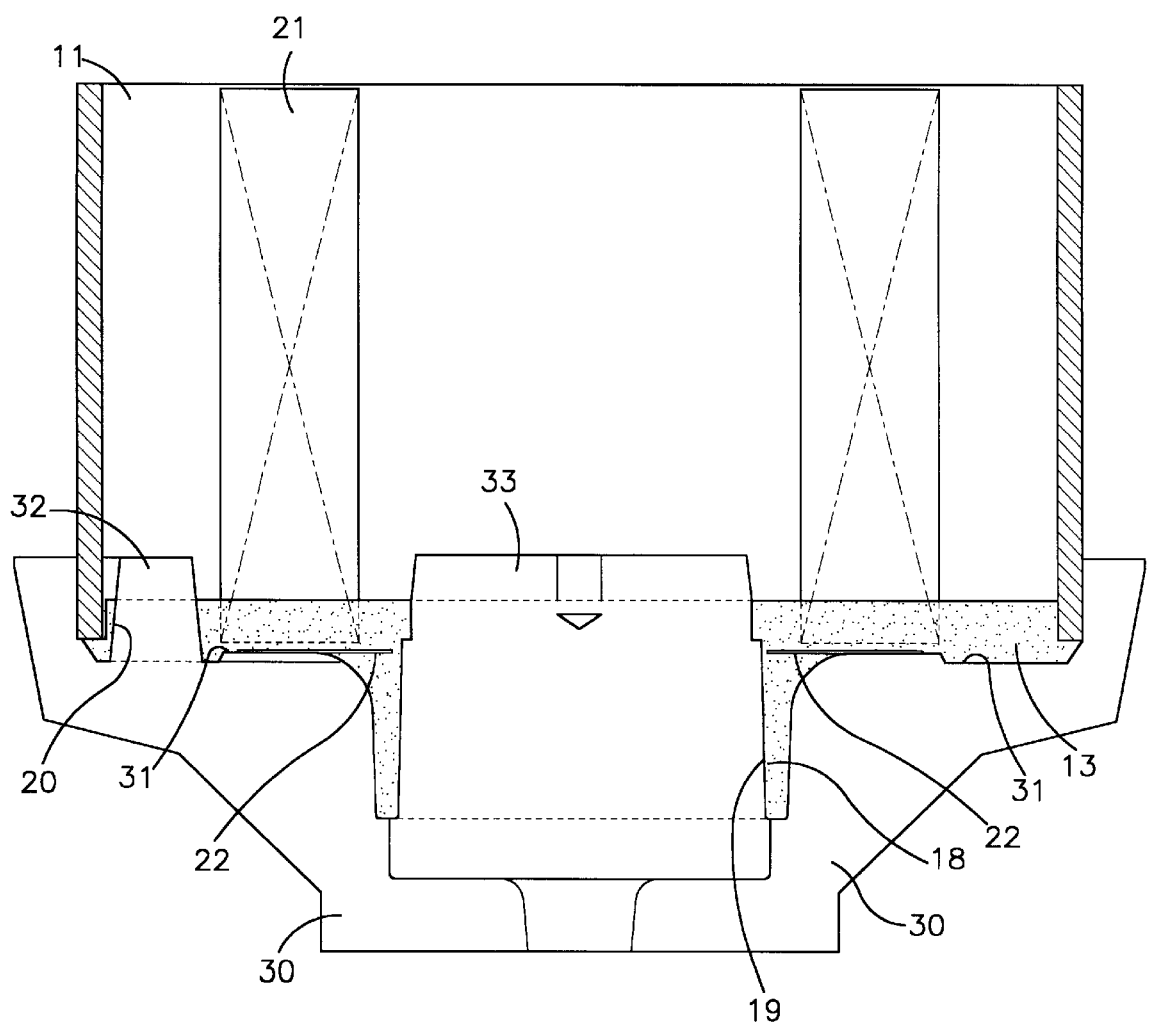
FIG. 3 is a side sectional view of mold used for making one of the end caps of the filter of FIG. 1.

Referring more particularly to the drawings and initially to FIG. 1, there is shown one embodiment of the present invention comprising a filter 10 for fluids, that is, gases or liquids, which may be used for motors, carburetors, compressors and other devices. The filter 10 is intended to show a typical filter which may incorporate the features of the present invention. The filter 10 comprises a generally cylindrical or tubular housing 11 which may be made of any suitable material such as plastic of metal, or which may be made of cardboard or similar material. On each end of the housing 11 are end caps 12 and 13. The end cap 12 is generally circular in shape and is molded onto one end of the housing 11 to close and to seal the open end of the housing. The other end cap 13 is also generally circular in shape and is molded to the other end of the housing 11, with an central portion 15 and a side portion 16. The central portion 15 of the end cap is generally circular and extends across the end of the filter element. The side portion 16 of the end cap 13 is formed at the outer circumferential periphery of the end cap where the end cap is molded to the housing 11. The central portion 15 of the end cap 13 has an interior surface 14 which is located inside the filter and an exterior surface 17 which is located outside the filter. The end portion 15 of the end cap 13 also includes a central cylindrical flange 18 which forms an outlet 19) for the filter 10. The end cap 13 also has a plurality of openings 20 radially spaced around the outlet flange 18. The openings 20 serve as fluid inlets for the filter. The end caps 12 and 13 are molded in place on each end of the housing 11. The end caps 12 and 13 are preferably formed of a hard thermoplastic resin, such as polyurethane or polyurea, or of a thermoset resin, such as plastisol, but may alternatively be formed of other softer resins or other materials which can be molded in place.

Inside the housing 11 and spaced inside of the inlet openings 20 is a tubular filter media or filter element 21. The filter element 21 is secured in place within the filter with each end of the filter element molded into the end caps 12 and 13. The filter element 21 may be, for example, a pleated element formed in a generally cylindrical arrangement. On either side of the filter element, an additional filter element in the form of a cylindrical mesh screen may be provided.

The foregoing elements of the filter 10 are generally known in the design of fluid filters and need not be described in further detail.

In accordance with this invention, the filter 10 is also provided with a spacer 22 between the end of the filter element 21 and one of the end caps 13. The spacer 22 is positioned between the end of the filter element 21 which is embedded in the end cap 13 and the exterior surface 17 of the end cap 13. The location of the spacer 22 assures that at least a minimal layer of the resin material of the end cap 13 will be present between the end of the filter element 21 and the exterior surface 17 of the end cap 13, and prevents the end of the filter element 21 from being exposed. Exposure of the end of the filter element 21 could otherwise result in leakage of fluid into the interior of the filter through the exposed filter element end.

The preferred spacer 22 of this invention is shown in more detail in FIG. 2. The spacer 22 is in the form of a thin plastic, annular disc 23. The spacer 22 should be capable of allowing the resin material of the end cap to permeate through the spacer, so that the resin material is present between the end of the filter element and the exterior surface of the end cap. As shown in FIG. 2, the spacer is preferably made of a plastic mesh material. A suitable material is formed of strands of polypropylene arranged into a square grid and having openings of 0.030 to 0.250 inches and having a thickness of approximately 0.020 to 0.080 inches. Because the spacer mesh material is polyethylene and the end cap resin material of the end cap is a material such as polyurethane, the materials are compatible, and the plastic mesh material would not provide substantial reinforcement to the resin material, but it would allow the resin material of the end cap to fill the openings in the mesh and thus permeate the spacer when the end cap is molded. This provides for a layer of resin material between the end of the filter element and the exterior surface of the end cap when the end cap is formed.

The use of the spacer 22 in the molding of the end cap 13 can be seen with reference to FIG. 3. The plastic resin is introduced into a mold 30. The mold 30 has a molding surface 31 and includes portions 32 which extend upwardly and form the inlet openings 20 of the end cap 13. A removable plug 33 is positioned in the center of the mold 30 and is used to form the flange 18 and the outlet 19. In accordance with usual practice, the tubular housing 11 and the filter element 21 are positioned in the mold 30 such that they rest on the upper surface 31 of the interior of the mold. The spacer 22, however, is positioned between the end of the filter element 21 and the surface 31 of the mold. The plastic resin in the mold 30 fills the mold to form the end cap 13 as shown in FIG. 3. The resin flows between the bottom end of the filter element 21 and the upper surface 31 of the interior of the mold 30 as it permeates the voids in the mesh of the spacer 22 to form a layer of plastic within the spacer between the bottom of the filter element and the mold surface. When the resin cures, this layer of plastic forms a thin layer between the end of the filter element 21 and the exterior surface 17 of the end cap 13. The layer formed by the spacer 22 would thus be exposed for at least a portion of the bottom surface of the filter element, and it would thus prevent exposure of the end of the filter element and avoid leakage through the cap 13.

In accordance with the usual practice in forming filters with opposite molded end caps, the other end cap 12 is formed after the plastic resin of the end cap 13 has cured. The other end cap 12 is formed in another mold, which is somewhat similar to the mold 30, but without the portions 32 and the plug 33 since the end cap 12 is closed. In general, there should be no need for a spacer when the end cap 12 is formed, since the filter element will be held away from the interior surface of the mold by reason of its being embedded in the end cap 13. If, however, a design of the filter is such that the filter element could rest on the interior surface of the mold, another spacer similar to the spacer 22 could be used in the molding of the end cap 12.

While the invention has been illustrated with respect to a particular filter arrangement, it should be understood that the invention can be modified to be incorporated into any filter of the type having a filter element embedded in an end cap. For example, filters of the type that do not have exterior cylindrical housings with interior filter elements and end caps which are formed on each end of the housing and filter elements may also use the present invention.

An example of another type of filter 110 using the present invention is shown in FIG. 4. The filter 110 is a panel air filter comprising end caps 112 and 113. The end caps 112 and 113 are molded onto each end of a top plate 111a and a bottom plate 111b which are typically made of steel and which together form parallel housing elements. The end caps 112 and 113 close and seal the sides of the top and bottom plates 111a and 111b. The end caps 112 and 113 are each generally rectangular in shape, with an central portion 115 and two side portions 116. The central portion 115 of each end cap is generally rectangular and extends across the end of the filter element. The side portions 116 of each end cap are formed at the top and bottom of the end cap where the end cap is molded to the top and bottom plates 111a and 111b. The central portion 115 of each end cap has an interior surface 114 which is located inside the filter and an exterior surface 117 which is located outside the filter. The top plate 111a includes an outlet 119 for the filter. The end caps 112 and 113 are molded in place on each end of the top and bottom plates 111a and 111b. The end caps 112 and 113, like the end caps 12 and 13, are preferably formed of a hard thermoplastic resin, such as polyurethane or polyurea, or of a thermoset resin, such as plastisol, but may alternatively be formed of other softer resins or other materials which can be molded in place.

Between the top and bottom plates 111a and 111b are pleated flat filter media or filter elements 121. The filter elements 121 are secured in place within the filter with each end of the filter element molded into the end caps 112 and 113. A spacer 122 is provided between the end of the filter elements 121 and each of the end caps is 112 and 113. The spacer 122, like the spacer 22, is positioned between the end of the filter element 121 which is embedded in the end cap and the exterior surface 117 of the end cap. The location of the spacer 122 assures that at least a minimal layer of the resin material of the end cap will be present between the end of the filter element 121. and the exterior surface 117 of the end cap and prevents the end of the filter element 121 from being exposed. Exposure of the end of the filter element 121 could otherwise result in leakage of fluid into the interior of the filter through the exposed filter element end. The preferred spacer would be essentially the same as that shown and described with reference to FIG. 2, but would be rectangular in shape instead of annular. The spacer 122 should be capable of allowing the resin material of the end cap to permeate through the spacer, so that the resin material is present between the end of the filter element and the exterior surface of the end cap. The spacer 122 would be used in forming the end caps in a similar manner to the spacer 22.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A filter, which comprises:

a filter element having opposite first and second ends;

a first end cap molded onto the first end of the filter element;

a second end cap molded onto the second end of the filter element, the second end cap formed of a plastic resin material, the second end cap having an central portion and a side portion, the central portion of the second end cap having an exterior surface and an interior surface, the filter element extending from the interior surface; and a spacer positioned between the second end of the filter element and the exterior surface of the second end cap, the spacer having a planar surface, the planar surface of the spacer being exposed for at least a portion of the exterior surface of the central portion of the second end cap, the plastic resin material permeating the spacer to provide a layer of the plastic resin material between the second end of the filter element and the outer surface of the second end cap, wherein the spacer is made from a material which does not substantially reinforce the plastic resin material of the end cap.

2. A filter as recited in claim 1, wherein the spacer is made of a plastic mesh material.

3. A filter as recited in claim 2, wherein the spacer permits molding material of the end cap to permeate the spacer to form a layer of material within the spacer between the end of the filter element and the exterior surface.

4. A filter as recited in claim 1, comprising in addition, a housing surrounding the filter element, the housing molded into the first and second end caps.

5. A filter as recited in claim 1, comprising in addition a second spacer positioned between the first end of the filter element and the exterior surface of the first end cap, the second spacer providing a layer of the plastic resin material between the end of the filter element and the outer surface of the first end cap.

6. A method of making a filter, comprising the steps of:

providing a mold for an end cap, the mold having a planar interior surface;

introducing a plastic resin material into the mold;

placing an end of a filter element into the mold;

positioning a spacer between the end of the filter element and the planar interior surface of the mold to allow the end of the filter element to rest on the spacer which in turn rests on the interior surface, the spacer having a planar surface which rests on the planar interior surface of the mold;

allowing the resin material to permeate the spacer to form an end cap with a layer of resin material between the end of the filter element and the interior surface of the mold; and removing the resin material from the mold to form an end cap.

7. A method of making a filter as recited in claim 6, comprising the additional step of forming a second end cap on the other end of the filter element.

8. A method of making a filter as recited in claim 7, wherein the step of forming a second end cap is accomplished by providing a second mold for the second end cap, the second mold having an interior surface;

introducing plastic resin material into the second mold;

placing the other end of the filter element into the second mold;

positioning a second spacer between the other end of the filter element and the interior surface of the second mold to allow the other end of the filter element to rest on the second spacer which in turn rests of the interior surface of the second mold;

allowing the resin material to permeate the second spacer to form the second end cap with a layer of resin material between the other end of the filter element and the interior surface of the second mold; and removing the resin material from the second mold to form the second end cap.

9. A method of making a filter as recited in claim 6, comprising the additional step of placing an end of an outer tubular housing into the mold when the end of a filter element is placed into the mold.

10. A method of making a filter as recited in claim 6, wherein the positioning step is preformed by placing a plastic mesh spacer into the mold.

* * * * *

UNITED STATES PATENT AND TRADEMARK OFFICE
CERTIFICATE OF CORRECTION

PATENT NO. : 5,891,337
DATED : April 6, 1999
INVENTOR(S) : Keller et al.

It is certified that error appears in the above-identified patent and that said Letters Patent is hereby corrected as shown below:

Column 1, line 50, "realied" should be --realized---.
Column 3, line 20, after "19" the right parenthesis ")" should be deleted.
Column 5, line 16, "is" should be deleted.
Column 5, line 22, after "121" the period "." should be deleted.

Signed and Sealed this

Twentieth Day of July, 1999

Attest:

Attesting Officer

Q. TODD DICKINSON

Acting Commissioner of Patents and Trademarks